US005494960A

United States Patent [19]

Rolando et al.

[11] Patent Number: 5,494,960
[45] Date of Patent: Feb. 27, 1996

[54] AQUEOUS POLYURETHANE DISPERSIONS AND ADHESIVES BASED THEREON

[75] Inventors: Thomas E. Rolando, Maple Grove; Peter A. Voss, Plymouth; Christopher M. Ryan, Dayton, all of Minn.

[73] Assignee: H.B. Fuller Licensing & Financing, Inc., Arden Hills, Minn.

[21] Appl. No.: 43,565

[22] Filed: Apr. 7, 1993

Related U.S. Application Data

[63] Continuation-in-part of Ser. No. 973,221, Nov. 6, 1992, which is a continuation of Ser. No. 624,618, Dec. 10, 1990, abandoned.

[51] Int. Cl.$^6$ .............................. C08J 3/00; C08K 3/20; C08L 75/00
[52] U.S. Cl. .................... 524/591; 524/539; 524/839; 524/840
[58] Field of Search ...................... 524/591, 839, 524/840, 539

[56] References Cited

U.S. PATENT DOCUMENTS

| | | |
|---|---|---|
| 4,147,679 | 4/1979 | Scriven et al. .................... 260/29.2 TN |
| 4,540,633 | 9/1985 | Kucera et al. . |
| 4,772,643 | 9/1988 | Ernst et al. .............................. 523/414 |
| 4,801,644 | 1/1989 | Coogan . |
| 4,851,459 | 7/1989 | Ramalingam . |
| 4,876,308 | 10/1989 | Melby . |
| 4,883,694 | 11/1989 | Ramalingam . |
| 4,923,756 | 5/1990 | Chung et al. . |
| 4,963,637 | 10/1990 | Barksby ..................................... 528/59 |
| 5,055,516 | 10/1991 | Fisch et al. .............................. 524/591 |
| 5,231,130 | 7/1993 | Fuessl et al. ............................. 524/839 |

FOREIGN PATENT DOCUMENTS

| | | |
|---|---|---|
| 0237997 | 9/1987 | European Pat. Off. . |
| 369389 | 5/1990 | European Pat. Off. . |
| 0315832 | 5/1991 | European Pat. Off. . |
| 49-099194 | 9/1974 | Japan . |
| 63-015816 | 1/1988 | Japan . |
| 1280750 | 8/1972 | United Kingdom . |
| 9115529 | 10/1991 | WIPO . |

OTHER PUBLICATIONS

Advances in Urethane Science and Technology, Frisch et al, eds., vol. 1, p. 2, Technomic Publishing Co., (1971).
Advances in Polyurethane Technology, Buist et al., eds. p. 11, John Wiley and Sons Inc. (1968).
"Aqueous Polyurethane Dispersions from TMXDI® (META) Aliphatic Isocyanate", American Cyanamid Co., Feb. 1989.
"Two New Isocyanates For The Polyurethane Industry", Journal of Cellular Plastics, Nov./Dec. 1982 Arendt et al.

*Primary Examiner*—Paul R. Michl
*Assistant Examiner*—Patrick Niland
*Attorney, Agent, or Firm*—Vidas, Arrett & Steinkraus

[57] ABSTRACT

Aqueous polyurethane dispersions used in adhesives for manufacturing laminate structures are provided with improved dispersion properties, which provide improved shelf-life stability of the dispersion and greater transparency and handling characteristics in application machinery for adhesives formulated therefrom, when a tertiary amine is present during an initial polyurethane prepolymer reaction between an isocyanate and a polyol component having acid functional groups. The initial reaction is carried out prior to formation of the dispersion in water.

16 Claims, No Drawings

5,494,960

AQUEOUS POLYURETHANE DISPERSIONS AND ADHESIVES BASED THEREON

CROSS REFERENCE

This application is a continuation-in-part of application Ser. No. 07/973,221, filed Nov. 6, 1992, incorporated herein by reference, which is a continuation of Ser. No. 07/624,618, filed Dec. 10, 1990, now abandoned.

FIELD OF THE INVENTION

The invention relates to improved aqueous dispersions of adhesive polymers.

BACKGROUND OF THE INVENTION

The use of aqueous dispersions of adhesive materials is well known. Such adhesive materials can come from a variety of compound and polymer classes and can form adhesive bonds using a variety of different chemical or physical transformations. One particularly useful class of adhesive dispersions involve the use of isocyanate compounds or a polyurethane in combination with other general classes and ingredients. Such isocyanate based dispersions have been used in the past to form adhesive bonds, coatings, or other functional structures wherein post application curing is an important aspect.

One particularly important application of such adhesive dispersions is in the manufacture of laminates from sheet-like substrates. In such laminate preparation, the aqueous dispersion is applied to a sheet-like substrate forming an adhesive line or film. Solvent or water is permitted to evaporate from the adhesive film and the film is contacted with a second sheet-like substrate under typical laminating conditions of temperature, pressure or other bond forming condition to join the sheet-like substrates into a laminate structure.

In large part, the prior art adhesive dispersion use isocyanate terminated compounds or blocked isocyanate compounds. Such isocyanate adhesives use the reactivity of the isocyanate group and have been found to have a variety of processing drawbacks including unstable or difficult to make dispersion properties, light sensitivity, short pot life, etc. The isocyanate polymer dispersion materials, when held at application temperatures prior to application to a substrate material, can pre-react, separate or can tend to cause gelation in particular during adhesive manufacture. The pre-reaction can be a reaction of isocyanate groups with active hydrogens forming urea or carbamyl bonds or can be an isocyanate trimerization into isocyanurate. These isocyanate reactions are generally promoted by amine compounds such as tertiary amines which are used to stabilize the dispersion but can also act as catalysts for the undesirable trimerization reaction. Because of this pre-reaction, insufficient bond strength can result when the laminate material is formed. Further, many polymeric dispersions based on isocyanate compounds can be resistant to forming dispersions and any dispersion formed can become unstable after manufacture. The typical isocyanate polymer found in the prior art tends to have high molecular weight and high viscosity limiting its utility in aqueous dispersions.

Witt et al., U.S. Pat. No. 3,870,684 discloses a broad range of aqueous, NCO terminated, polyurethane prepolymers having acid functionality which can be reacted with chain lengthening agents including glycols and amines. The polyurethane prepolymers are derived from highly reactive aromatic and primary and secondary aliphatic isocyanates which can quickly form unmanageable gels unless the reactants and reaction conditions are carefully controlled.

Scriven et al., U.S. Pat. Nos. 4,066,591 and 4,147,679 discloses coating compositions using urethane chemistry. An NCO— terminated prepolymer containing acid salt groups is shown with a tertiary amine to neutralize excess acid within the prepolymer. Again, careful control of reactants and reaction conditions are necessary to reduce and/or prevent the gelling of the prepolymer which is derived from highly reactive aromatic and primary and secondary aliphatic isocyanates.

Kucera et al., U.S. Pat. No. 4,540,633 discloses adhesive compositions formed by mixing a polyurethane dispersion and an epoxy dispersion.

Ramalingam, U.S. Pat. No. 4,851,459 discloses water dispersed polyurethane systems in which NCO terminated prepolymers are reacted with a peroxide compound containing at least one active hydrogen atom. These prepolymers may then be crosslinked using an epoxy functional compound.

Long, European Patent Application No. 369389 teaches NCO— terminated aqueous dispersions containing a variety of aromatic and aliphatic isocyanate compounds in low molecular weight polymers.

"Aqueous polyurethane dispersions from TMXDI® (META) aliphatic isocyanate", American Cyanamide Company, February 1989 discloses the use of tetramethylxylene diisocyanate in the preparation of anionic dispersions of polyurethanes.

Arendt et al., "m- and p-TMXDI: Two New Isocyanates For The Polyurethane Industry", Journal of Cellular Plastics, November–December 1982 discloses the use, structure and properties of tetramethylxylene diisocyanates.

SUMMARY OF THE INVENTION

The invention pertains to an aqueous polyurethane dispersion and its use in adhesives for manufacturing laminate structures. In particular, it has been discovered that improved dispersion properties, which provide improved shelf-life stability of the dispersion and greater transparency and handling characteristics in application machinery for adhesives formulated therefrom, are obtained when a tertiary amine is present during an initial polyurethane prepolymer reaction between an isocyanate and a polyol component having anionic functional groups. The initial reaction is carried out prior to formation of a dispersion in water. In this regard the invention significantly differentiates from prior art methods which only add tertiary amine as a dispersion stabilizer at the time an aqueous dispersion is formed.

In one aspect the invention may be characterized as an improved method of producing an aqueous dispersion of a polyurethane polymer, the method including the steps of:

(i) reacting a mixture of (a) an aliphatic polyfunctional isocyanate compound, and (b) an acid functional polyol component to form a polyurethane prepolymer, the polyol component comprising a polyol having at least two isocyanate reactive hydrogens and at least one acid functional group or a combination of a polyol free of acid functionality having at least two isocyanate reactive hydrogens and a compound having acid functionality and hydroxy, amine or thiol functionality; and then (ii) dispersing the resulting polyurethane prepolymer in water in the presence of a dispersion stabilizing amount of a tertiary amine, the improvement wherein the tertiary amine is added to the prepolymer forming reaction mixture of isocyanate compound and the polyol component prior to said prepolymer forming reaction.

Typically the prepolymer will have a residual level of isocyanate functionality which is extended and terminated after its dispersion in water by reaction with amine functional compounds so that the final dispersed polyurethane polymer is substantially free of isocyanate functionality and has residual hydroxyl and/or amine functional groups. The residual amine and hydroxyl groups render the dispersed polymer crosslinkable by reaction with a suitable crosslinking agent such as a polyepoxide.

Aqueous polyurethane dispersions formed by the process of the invention constitute a further aspect of the invention.

Still further aspects of the invention are aqueous dispersed adhesives containing about 10 to 80 wt. % of a polyurethane polymer of the invention and about 0.1 to 10 wt. % of a crosslinking agent that can react with the residual amine and/or hydroxyl groups remaining in the polyurethane polymer after its preparation is complete.

Laminates comprising a pair of substrates, at least one of which is transparent, bonded together by a cured adhesive of the invention comprise yet further aspects of the invention.

A still further aspect of the invention comprises novel aqueous polyurethane dispersions characterized by a median particle size of 80 nm or less. Such dispersions may be prepared by the method described herein.

DETAILED DESCRIPTION OF THE PREFERRED EMBODIMENT

The preferred polyurethane prepolymer of the invention is prepared by reacting an aliphatic isocyanate compound with an acid functional polyol component in the presence of a tertiary amine. Suitably the prepolymer is left with a residual level typically 2.0–3.0%) of isocyanate groups which can be reacted with chain extenders and chain terminators after dispersion so as to increase the molecular weight of the dispersed polymer and provide pendant reactive crosslinkable groups. The final polyurethane polymer is substantially free (<0.5%) of isocyanate groups.

The method of the invention may be used to produce novel polyurethane dispersions which are characterized by median particle sizes of 80 nm or less, typically 30–80 nm, preferably 70 nm or less. Median particle sizes are determined conventionally, for instance by use of a BI-90 particle sizer sold by Brookhaven Instruments. By contrast to prior art polyurethane dispersions which have median particle sizes of at least 100 nm and a milky appearance, the small particle size dispersions of the invention are almost clear and have much improved machinability properties.

In the preferred embodiments the aliphatic isocyanate is a hindered isocyanate compound. The use of a hindered isocyanate helps prevent isocyanurate trimer formation during polymer manufacture and reduces reactivity of residual isocyanate groups on the prepolymer to water. The hindered isocyanate compound can be any di-, tri- or polyfunctional isocyanate having tertiary aliphatic isocyanate functionality. Representative, non-limiting examples of such isocyanates include m-tetramethylxylene diisocyanate and p-tetramethylxylene diisocyanate. Other polyisocyanates containing at least one sterically hindered group, such as isophorone diisocyanate are also usefully employed in the preferred embodiments.

The hindered polyfunctional isocyanate is reacted with a polyol component providing acid functionality that will permit formation of stable dispersions in aqueous amine solution. Therefore, the prepolymer obtains a proportion of dispersibility from its pendant anionic groups.

The polyol component of the prepolymer reaction mixture may comprise an acid grafted polyether polyol such as the polypropylene oxides grafted with, for example, maleic or fumaric acid, as taught in Frentzel et al., U.S. Pat. No. 4,460,738 or Knopf et al., U.S. Pat. No. 4,528,334. Other polyester polyols produced from mixtures of di and tri or higher functional acid and polyol components in ratios which provide residual acid functionality as well as plural hydroxy groups may also be employed.

Alternatively, the polyol component comprises a mixture of a polyol free of acid functionality and an acid functional compound having hydroxy, amine or thiol functionality. Suitable such acid functional compounds include hydroxy and mercapto carboxylic acids, amino carboxylic acids, a. minohydroxy carboxylic acids, hydroxysulfonic acids, amino sulfonic acids, and aminohydroxy sulfonic acids. Representative, non-limiting examples of such acids include dimethylolpropionic acid, glycolic acid, thioglycolic acid, lactic acid, malic acid, dihydroxymalic acid, tartaric acid, dihydroxytartaric acid, 2,6-dihydroxybenzoic acid, oxaluric acid, anilidoacetic acid, glycine, α-alanine, 6-aminocaproic acid, the reaction product of ethanolamine and acrylic acid, hydroxyethylpropionic acid, 2-hydroxyethanesulfonic acid and sulphanilic acid.

Desirably the polyurethane prepolymer has sufficient acid groups to provide an acid number of between about 10 and 30, preferably 14–16. The acid number is defined as the number of milligrams potassium hydroxide required to neutralize all the acid groups of the material. It is determined by titration per ASTM D-1639.

Preferably, the polyhydroxy polymer compound or polyol used to make the prepolymer of the invention has a molecular weight of 500 to 3,000, more preferably 1,000 to 2,000. Such polymers can be polyester condensation products of commercially available of dicarboxylic acids and hydroxy compounds such as diols, triols, tetraols, etc. Additionally, such polymers can be polyether diols, triols, etc., based on polymers of ethylene oxide or propylene oxide.

The polyhydroxyl materials or polyols can be either low or high molecular weight materials and in general will have average hydroxyl values as determined by ASTM E-222-67, Method B, between about 1000 and 10, and preferably between about 500 and 50. The term "polyol" is meant to include materials having an average of two or more 5 hydroxyl groups per molecule.

The polyols include low molecular weight diols, triols and higher alcohols, low molecular weight amide-containing polyols and higher polymeric polyols such as polyester polyols, polyether polyols and hydroxy-containing acrylic interpolymers.

The low molecular weight diols, triols and higher alcohols useful in the instant invention are known in the art. They have hydroxy values of 200 or above, usually within the range of 1500 to 2000. Such materials include aliphatic polyols, particularly alkylene polyols containing from 2 to 18 carbon atoms. Representative, non-limiting examples include ethylene glycol, 1,4-butanediol, 1,6 hexanediol and cycloaliphatic polyols such as 1,2 cyclohexanediol and cyclohexane dimethanol. Representative, non-limiting examples of triols and higher alcohols include trimethylol propane, glycerol and pentaerythritol. Also useful are polyols containing ether linkages such as diethylene glycol and triethylene glycol and oxyalkylated glycerol.

Where flexible and elastomeric properties are desired, the polyurethane prepolymer should preferably contain at least a portion of a higher molecular weight polymeric polyol. Such a polymeric polyol should be predominantly linear (that is, absence of trifunctional or higher functionality ingredients) to avoid any chance of gelling of the resultant polymeric product and should have a hydroxyl value of 200 or less, preferably within the range of about 150 to 30.

The most suitable polymeric polyols include polyalkylene ether polyols including thioethers, polyester polyols including polyhydroxy polyesteramides and hydroxyl containing polycaprolactones and hydroxy-containing acrylic interpolymers.

Any suitable polyalkylene ether polyol may be used. Included are poly(oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide in the presence of an acidic or basic catalyst.

Besides poly(oxyalkylene)glycols, any suitable polyhydric polythioether may be used such as, for example, the condensation product of thioglycol or the reaction product of a polyhydric alcohol, such as disclosed herein for the preparation of hydroxyl polyesters, with thioglycol or any other suitable glycol.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols. Suitable polyester polyols are sold by Ruco Corp. under the Rucoflex® trademark, including Rucoflex 1011, 1019, 108, 1015, 1035, 1040, 101, 102, 1037 and 1095.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxyalkylated bisphenols, polyether glycols, for example, poly(oxytetramethylene) glycol and the like. However, other diols of various types and, as indicate polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

In a preferred embodiment, the polyfunctional polyol compound is reacted with the hindered aliphatic polyfunctional isocyanate in the presence of a strong catalyst at a temperature from about 40° to 140° C., more preferably from about 50° to 120° C., and most preferably, from about 60° to 100° C. A representative non-limiting list of catalysts which may be used to drive this reaction includes t-amines and organometallics such as dibutyltindilaurate, tin oleate, lead naphthanate, etc. Tin catalysts are preferred. The hindered isocyanate can be reacted with the polyol at an isocyanate/OH ratio of about greater than 1.1 moles of isocyanate per mole of OH, preferably 1.2 moles to 2.0 moles isocyanate per mole of OH and most preferably about 1.4 to 1.7 moles isocyanate per mole of OH. When a small molecule polyol with pendant acid functionality is used with an acid free polyol, the acid compound can be added at a rate of about 5 to 15 wt. % of the polyol.

The polyurethane polymer is stabilized in dispersion by interaction of the acid functional groups on the polymer with the tertiary amine compound. Without being bound thereby, it is believed that the better dispersion properties, in particular the smaller particle sizes, obtained by the process of the invention are the result of a more complete neutralization of the acid groups of the polymer when the tertiary amine is added during the polyurethane prepolymer forming reaction. Suitably the tertiary amine compound has three aliphatic substituents. Such substituents can be $C_{1-15}$ alkyl groups which may optionally be cyclic aliphatic groups. The tertiary amine may also be a cyclic aliphatic amine compound. Specific examples of such tertiary amines include trimethylamine, triethylamine, tri-n-propyl amine, tri-n-butyl amine, N-methylpiperidine, N-ethylpiperidine, N-methylpyrrolidine, ethyldipropyl amine, etc.

When the acid number of the prepolymer is 10–14, the amount of tertiary amine used in the prepolymer forming reaction should be at least sufficient to completely neutralize all of the acid groups on the prepolymer. When the acid number of the prepolymer is greater than 14, the amount of tertiary amine used in the prepolymer forming reaction should be at least sufficient to completely neutralize an equal amount of material having an acid number of 14. This is an amount substantially greater than would be used to simply catalyze a reaction of isocyanate and polyol groups.

One advantage of the preferred dispersions of the invention is that the materials can be stabilized using a tertiary amine which can catalyze the trimerization of other isocyanate compounds. It has been found that the aliphatic hindered isocyanate compounds will not trimerize in the dispersions of the invention providing an important stability advantage.

The viscosity of the isocyanate prepolymer, prior to dispersion formation, is typically less than about 5000 cps. However, higher viscosities, if useful for a particular end use, can be made. The prepolymer preferably has an isocyanate content of between about 2.0 and 3.0% by weight.

In the formation of the preferred adhesive polymer dispersion of the invention, a preferred polymer can be manufactured by reacting the hindered di- or tri isocyanate compound, an acid functional polyol, additional optional amounts of polyol free of acid functionality and amounts of chain extending agents and chain terminating agents that cooperate to control molecular weight. Generally it is desirable to utilize chain extending and terminating agents after dispersion of the prepolymer in water. Chain extenders are suitably compounds having two or more amine groups more reactive to isocyanate than water. Chain terminators are suitably compounds having a single isocyanate reactive amine group.

The chain extending agent is added in a proportion that leaves less than 0.5 wt. %, generally less than 0.1 wt. %, preferably free of free reactive isocyanate. The chain termination agent is used at an amount that controls molecular weight to about 1,500 to 10,000 and results in little free isocyanate (i.e., less than 0.5 wt. %). Small molecule chain extending agents and small molecule chain terminating agents, when used, are preferably added at a rate of less than about 5 wt. % of the dispersed polyurethane prepolymer. If high molecular weight agents are used amounts should be adjusted accordingly.

The di- tri-, etc., amines which can be employed as chain extenders in the preparation of the urethanes of the invention can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other non-reactive groups can be present attached to the carbon atom, such as oxo, sulfo, halo or nitroso. Representative, non-limiting examples of suitable aliphatic and alicyclic diamines include 1,2-ethylenediamine, 1,2-propylenediamine, 1,8-menthanediamine, isophorone diamine, propane 2,2-cyclohexylamine, methane-bis-(4-cyclohexylamine), and

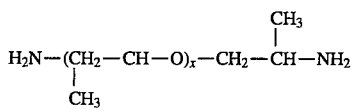

where x=1 to 10.

Aromatic diamines such as phenylene diamines and toluene diamines can be employed. Exemplary of the aforesaid amines are: o-phenylene diamine and p-toluene diamine. N-alkyl and N-aryl derivatives of the above amines can be employed such as, for example, N,N'-dimethyl-o-phenylene diamine, N,N'-di-p-tolyl-m-phenylene diamine, and p-aminodiphenylamine. Polynuclear aromatic diamines can be employed in which the aromatic rings are attached by means of a valence bond such as, for example, 4,4'-biphenyldiamine, methylenedianiline and monochloromethylenedianiline.

Aminoalcohols, and aminophenols can be employed as chain terminators which leave a residual hydroxyl groups available for subsequent crosslinking reactions. Representative, non-limiting examples include monoethanolamine, and p-aminophenol.

The final dispersed polyurethane polymer of the invention is substantially free of reactive isocyanate groups, is typically hydroxy terminated, and has a substantial proportion of neutralized acid functional pendant groups which in combination with the neutralizing tertiary amine compound cooperate to stabilize the polymer in the aqueous dispersion.

The aqueous vehicle in which the polyurethane polymer is dispersed may optionally have added to it dispersing agents, thixotropes or hardeners among other potential constituents which may be wholly or partially dissolved in the aqueous phase. Minor amounts of organic solvents may be included but it is most preferred that the vehicle be free of organic solvents. Such a liquid vehicle is useful in minimizing environmental and safety hazards often prevalent with the use of volatile organic solvents.

Dispersing agents which can be used in the composition of the present invention generally include any physical or electrical dispersant which is not deleterious to the stability or curing ability of the thermoset. The dispersing agents preferably does not affect the chemical stability of the aqueous adhesive by reducing shelf life either in the liquid state or in the solid film state prior to cure but after the composition is applied. To this end, dispersants used in the composition of the present invention may either be retained in the film once formed or vaporized upon evaporation of the liquid vehicle from the composition or upon curing of the thermoset. Suitably the concentration of such dispersant within the dispersion is about 5% by weight or less.

Optionally, the dispersed phase may also comprise fillers or other functional material depending on the intended application.

The polyurethane polymer dispersion preferably has a solids content of about 10 to 80 wt. %, preferably about 20 to 60 wt. %, and most preferably from about 30 to 40 wt. %. Further, this polymer dispersion has a low viscosity of from about 25 to 2,000 cps, preferably from about 50 to 1,000 cps, and most preferably from about 100 to 300 cps.

The polyurethane dispersion of the present invention will remain storage stable and fully dispersed within the liquid vehicle for extended periods of time. During storage the level of particle separation or the degree of particle dispersion present does not change to a degree that the dispersion is broken or particle clumping can interfere with the formation of an effective bond.

ADHESIVE FORMULATIONS

The dispersions of the invention may be used alone as adhesives where relatively low peel strength is advantageous, such as on bonded seams of multi-layer laminated plastic or plastic/metal foil snack food packages and the like where a peelable bond facilitates opening of the package.

The dispersions of the invention may also be used with a crosslinking agent to produce an adhesive which is particularly suited for use as laminating adhesives for retortable packaging materials. Such adhesives of the invention comprise a mixture of the polyurethane dispersion of the invention with a suitable curing agent which will react with functional groups on the polymer to form a crosslinked adhesive. Particularly suitable curing agents include aminoplast resins, formaldehyde, phenolic resins, alkoxy silanes, organic polyisocyanates, carbodiimide materials, aziridine materials, and epoxy containing organic materials. Water soluble or water dispersible crosslinking agents are simply added to the finished dispersion materials. More hydrophobic materials such as some organic isocyanates and some epoxy containing organic materials must be pre-dissolved or pre-dispersed in solvent or water prior to the preparation of the final adhesive dispersions. Preferred curing or crosslinking agents for use in the invention are epoxy compounds. Such epoxy compounds can be any small molecular or polymeric compound or mixtures thereof having 1,2-epoxy equivalency greater than 1. Epoxy equivalency greater than 1 indicates that the average number of 1,2-epoxy groups per molecule is greater than 1. Preferably, the epoxy equivalency is about 2 or more. The useful class of polyepoxies are the glycidyl ethers of polyphenols such as bisphenol A or a polyol such as butane diol.

When used, the crosslinking agent is added to the polyurethane dispersion of the invention shortly prior to the application of the mixture to a substrate. Suitably about 0.01 to 10 parts by weight, preferably 0.05 to 5 parts of a crosslinking agent per part of the polyurethane dispersion. This agent may be added directly to the prepolymer or in an aqueous solution or dispersion. After the addition of the crosslinking agent to the aqueous polymer dispersion, but before curing, the dispersion maintains a relatively low viscosity. Preferably, the viscosity is less than about 1,000 cps, and more preferably it is between about 100 and 500 cps. The aqueous adhesive dispersion preferably contains between 20 and 60 wt. % solids, and more preferably between 30 and. 40 wt. % solids.

APPLICATION OF THE ADHESIVE

The aqueous adhesive dispersion of the present invention is very versatile as it can be applied in many conventional operations. Application may be performed by spraying, roll coating, the use of doctor blades, brushing and dipping. The adhesive can further be applied under a variety of conditions. The adhesive can further be applied to a wide variety of substrates including polyolefins, polyesters, metal films, polyethylene, low density polyethylene, nylon, PET, paper, cellophane, polypropylene, oriented polypropylene, linear low density polypropylene, metallized polyester, etc. The substrate may have many useful properties, and it preferred that the substrate has properties desired in the flexible packaging industry and the retortable packaging industry. Such properties including high tensile strength, vapor barrier properties, flexibility, rigidity, resistance to thermal degradation may be desirable depending upon the intended use of the laminate.

After the adhesive dispersion has been applied to the first substrate, it is preferably dried to form an adhesive film on the surface of the substrate. Any method known to those skilled in the art may be used to dry the adhesive, including conventional ovens, circulating ovens, infrared radiation, heat lamps, as well as flash drying the adhesive on the substrate surface. When a circulating oven is used, it is preferred that the adhesive is dried at a temperature of about 50° to 85° C. at about ambient pressure for about 0.25 to 1 minute.

After the adhesive is dried on the first substrate, a second substrate is contacted with the adhesive film. This substrate may be of the same or different material in comparison to the first substrate. This second substrate can be applied to the adhesive film by application of pressures and temperatures commonly used in film laminating equipment. The use of different substrates allows one to prepare a laminate combining properties of rather varied substrates which properties would otherwise be impossible to contain in a single flexible film. Thus, it may be desirable to laminate one film having excellent moisture vapor barrier properties to another film having excellent strength characteristics. The choice of substrates would therefore be up to the skilled practitioner in this art to achieve a laminate of the particular desired properties for that user.

After the second substrate has been contacted with the adhesive layer, the bond may be cured by subjecting it to conditions which cause the crosslinking agent to react with the polyurethane prepolymer. The cure conditions are dictated by the crosslinking agent incorporated into the prepolymer. Preferably, this is done at elevated temperature and pressure. After this processing, the laminate shows superior adhesive properties. Such properties include excellent shear and peel results.

The small median particle size of the dispersions of the invention is especially beneficial when used as a laminating adhesive for sheet packaging materials. gravure cylinders used in machinery for manufacturing these materials tend to become frequently clogged, resulting in uneven adhesive distribution, when adhesives of the prior art (which have median particle sizes of at least 100 nm) are used. Clogging is especially a problem when machinery is stopped for brief periods, such as maintenance or work breaks. It has been found that adhesives of the invention which characterized by median particle sizes of 80 or less are much less susceptible to clogging of gravure cylinders in application equipment under comparable use conditions.

The present invention may be further understood by reference to the following specific examples which are illustrative of the method of forming the adhesive laminate of the present invention.

EXAMPLE 1

Into a three neck flask provided with a thermometer, inert gas source and mechanical stirrer was placed 16.3 grams of poly(propyleneoxide) diol (Voranol 220- 110, Dow Chemical), 3.9 grams of an adipic acid/hexanediol/isophthalic acid polyester diol (Rucoflex 1019-35, Ruco), 1.2 grams of dimethylolpropionic acid, 8.1 grams of tetramethylxylene diisocyanate (TMXDI), 0..9 grams of triethylamine (equivalent to neutralization of acid groups) and 0.01 grams of dibutyltindilaurate. The contents were heated to 200° F. for approximately 3.5 hours until a NCO content of 2.0% was achieved. The resulting polyurethane prepolymer was then added to 68.0 grams of water with vigorous stirring. After all of the prepolymer was added a mixture of 2.0 grams of water, 0.3 grams of ethylenediamine and 0.15 grams of ethanolamine were added to the dispersion. The resulting dispersion contained about 30% solids and had a pH of about 8.0. Other properties of the dispersion were as follows:

Prepolymer acid number=16.5

Appearance (dispersion)—almost clear.

Median particle size—70 nm, mostly monomodal, narrow particle size distribution.

Appearance (film)—clear

Machineabilty—excellent, open set time test indicates greater than 5 minutes

Shelf life stability—greater than 3 months.

COMPARATIVE EXAMPLE

The procedure of Example 1 was repeated except that the triethylamine was added to the dispersing water, rather than to the initial prepolymer reaction mixture. Properties of the dispersion were as follows.

Appearance (dispersion)—white, milky, precipitate.

Median particle size—greater than 100 nm, bimodal or higher, larger particle size distribution.

Machinability—poor, open time 1 minute or less pH—9.0 to 10.0

Shelf life stability—the dispersion begins to form a water and a polymer layer in several days.

EXAMPLE 2

Into a three neck flask equipped with a thermometer, inert gas source and mechanical stirrer was placed 25.4 grams of an adipic acid/propylene glycol polyester diol (Rucoflex 108-46, Ruco), 1.35 grams dimethylolpropionic acid, 7.6 grams of TMXDI, 1.0 grams triethylamine (equivalent to 95% neutralization of acid groups) and 0 0.01 grams of dibutyltindilaurate. The contents were heated to 180° F. for approximately 1.5 hours until a % NCO content of 2.5% was achieved. The above prepolymer (acid number=16) was then added to 63.0 grams of water with vigorous stirring. After all of the polymer was added a mixture of 2.0 grams of water, 0.3 grams of ethanolamine and 0.4 grams of ethylenediamine were added to the dispersion. The resulting dispersion contained about 35% solids, and had a pH of about 8.0. The median particle size was 60 nm.

EXAMPLE 3

Into a three neck flask equipped with a thermometer, inert gas source and mechanical stirrer was placed 26.4 g Voranol 220-110 (Dow Chemical), 2.1 g dimethylolpropionic acid, 9.4 grams isophorone diisocyanate (IPDI), 1.6 grams triethylamine (equivalent to 100% neutralization of acid groups) and 0.01 grams dibutyltindilaurate. The contents were heated to 180° F. for approximately 2.0 hours until a % NCO content of 2.4% was achieved. The above prepolymer (acid number 22) was then added to 68.0 grams of water with vigorous stirring. After all of the polymer was added a mixture of 2.0 grams of water, 0.25 grams ethylenediamine and 0.2 grams ethanolamine were added to the dispersion. The resulting dispersion contained about 30% solids and had a pH of about 8.0. The median particle size was 40 nm.

EXAMPLE 4

Into a three neck flask equipped with a thermometer, inert gas source, and mechanical stirrer was placed 13.3 grams of a polyether triol (Voranol 230-112, Dow Chemical) and 1.3 grams of phthalic anhydride. The contents were heated to 310°–320° F. and held for approximately 1 hour until an acid number of 34±1 was achieved. The resulting acid functional polyester polyol was cooled to 150° F. and 14.0 grams of an adipic/isophthalic/hexanediol polyester (Rucoflex 1019-55), 5.7 grams of IPDI (Huls) and 0.9 grams of triethylamine were then added and the mixture heated to 170° F. and held for approximately 1 hour until a NCO content of 2.4% was achieved. The prepolymer was then added to 62.1 grams of water with vigorous agitation. After all of the polymer was added, a mixture of 2.0 grams of water, 0.4 grams of ethylene diamine and 0.3 grams of ethanolamine was added to the dispersion. The resulting dispersion contained 35% solids and had a pH of 7.5. The median particle size was 70 nm.

EXAMPLE 5

259 g (0.52 eq) of a 1000 MW polypropylene glycol was dried under vacuum at about 100° C. for about 1 hour. About 159 g (1.3 eq) tetramethylxylene diisocyanate was added, stirred for about 30 minutes and the temperature allowed to drop to about 80° C. Once the temperature has equilibrated, about 23 g (0.23 eq) triethylamine was added at once. Again the temperature was allowed to equilibrate and about 30 g (0.45 hydroxyl eq) dimethylolpropionic acid was added. After 4 hours the NCO content was checked. About 582 g deionized water (582 g) was added and the mixture stirred until dispersion was complete (about 5 minutes). About 20 g (0.33 eq) monoethanolamine in about 100 g deionized water was added and stirring maintained for about 10 minutes followed by filtration of the product. pH=8.0, solids=40%.

Screening this product as a film laminating adhesive involved laminating a few substrates typical of flexible packaging and monitoring the 180° peel over time. About 10 parts of the urethane dispersion was blended with about 1 part of an epoxy crosslinking agent having epoxy equivalent weight of 190. The resultant mixture was diluted to about 30% solids and drawn on polyester film. The film was dried in a circulating oven at about 130° F. for about 3 minutes. A second substrate was laminated to this and 1 inch test strips were cut. Each test strip was subjected to 40 psi at 160° F. for 1 second. Accelerated curing was performed in an oven at 130° F. for 20 hours. Half of the test strips were immersed in boiling water for one hour. All test strips were then tested for 180° peel at a rate of 12 inches per minute.

| | Film Laminating Performance | |
|---|---|---|
| Secondary Substrate | Without Water Boil | 1 Hour Water Boil |
| Polyethylene | Destruct | Destruct |
| Polypropylene | Destruct | 400 g/in |
| Polyester | 500 g/in | 100 g/in |
| Foil | 700 g/in | Destruct |

LACK OF UNDESIRED SIDE REACTIONS AVAILABLE FOR A HINDERED ISOCYANATE

To illustrate the lack of side reactions which a hindered isocyanate will undergo in the manufacture of polyurethane dispersions the following kinetics study was done.

In a vessel containing dry toluene was placed TMXDI (0.65M) and triethylamine (0.64M). The mixture was heated to 90° C. for four days during which time the unreacted isocyanate was monitored using the standard titration method. No change was observed which supports the inability of the hindered isocyanate to undergo self reactions to form dimers or trimers.

Another reaction rate study was performed to verify the slower reactivity of hindered versus unhindered isocyanate with the carboxylic acid groups present in the polyurethane manufacturing process. A procedure identical to the one used above was carried out with the following combinations.

| | | | Rate Constants (98° C.) |
|---|---|---|---|
| TMXDI | Acid | | $6.2 \times 10^{-6}$ eq$^{-1}$s$^{-1}$ |
| H-MDI | Acid | | $4.5 \times 10^{-5}$ |
| TMXDI | Acid | Amine | $4.6 \times 10^{-6}$ |
| TMXDI | Alcohol | Amine | $3.6 \times 10^{-4}$ |
| TMXDI | Alcohol | | $3.4 \times 10^{-5}$ |

A hydrogenated MDI (H-MDI; typified by Desmodur W) was used as an unhindered isocyanate to compare with the hindered isocyanate. Triethylamine (amine) is typically used in the manufacture of the isocyanate. 2,2-Dimethylbutyric acid (acid) is a carboxylic acid similar in structure to dimethylolpropionic polyol used in polyurethane synthesis. The H-MDI/acid reaction formed a precipitate after only three hours accompanied by evolution of gas indicative of product formation. Isocyanates react with carboxylic acids to give an amide and $CO_2$. The inverse concentration of unreacted isocyanate was plotted versus time for each reaction as is common for second order reactions. From these plots rate constants could be calculated. The results shown in the Table illustrate the greater reactivity that an unhindered isocyanate has towards carboxylic acid groups than a hindered isocyanate-even in the presence of amine catalyst.

The above descriptions and examples are provided to aid in a complete, non-limiting understanding of the invention. Since many variations of the invention can be made without departing from the spirit and scope of the invention, the breadth of the invention resides in the claims hereinafter appended.

We claim:

1. An improved method for producing an aqueous dispersion of a polyurethane polymer, the method including the steps of:
   (i) reacting a mixture of (a) an aliphatic polyfunctional hindered isocyanate compound, and (b) an acid functional polyol component to form a polyurethane prepolymer, the polyol component comprising a polyol having at least two isocyanate reactive hydrogens and at least one acid functional group or a combination of a polyol free of acid functionality having at least two isocyanate reactive hydrogens and a compound having acid functionality and hydroxy, amine or thiol functionality; and then
   (ii) dispersing the resulting polyurethane prepolymer in water in the presence of a dispersion stabilizing amount of a tertiary amine,
the improvement wherein the prepolymer has an acid number of between 10 and 22, the dispersion is free of volatile organic solvents and the tertiary amine is added to the prepolymer forming reaction mixture of isocyanate compound and the polyol component prior to said prepolymer forming reaction.

2. The method of claim 1 wherein the acid functional polyol component comprises a compound containing pendant carboxylic acid groups, sulfonic acid groups or mixtures thereof.

3. The method of claim 2 wherein the acid functional polyol component comprises a carboxylic acid functional polyol.

4. The method of claim 1 wherein the acid functional polyol component comprises an acid functional polyol and a second polyol compound which is free of acid functionality.

5. The method of claim 4 wherein the second polyol compound comprises a polyether diol.

6. The method of claim 4 wherein the second polyol component comprises a polyester diol.

7. The method of claim 1 wherein the polyurethane prepolymer resulting from said reacting step has residual isocyanate functionality.

8. The method of claim 7 wherein the residual isocyanate content is 2–3 weight percent NCO.

9. The method of claim 7 comprising the further step of reacting said residual isocyanate functionality with a chain extending agent having at least two primary or secondary amine groups per molecule amine and a chain terminating agent having a single primary or secondary amine group per molecule, after said water dispersing step.

10. The method of claim 9 wherein the chain extending agent is selected from the group consisting of 1,2-ethylenediamine, 1,2-propylenediamine, 1,8-menthanediamine, isophorone diamine, propane 2,2-cyclohexylamine, methane-bis-(4-cyclohexylamine),

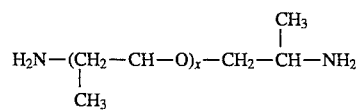

where x=1 to 10, and primary or secondary aromatic diamines.

11. The method of claim 1 wherein the polyurethane prepolymer resulting from said reacting step has residual isocyanate functionality; the method further comprises the further step of reacting said residual isocyanate functionality with a chain extending agent having at least two primary or secondary amine groups per molecule amine and a chain terminating agent having a single primary or secondary amine group per molecule, after said water dispersing step; and the dispersion resulting from said further step has a pH of 7.5–8.5.

12. The method of claim 1 wherein the acid number of the prepolymer is 10 to 14 and the amount of tertiary amine is at least sufficient to neutralize all of the acid groups of the prepolymer.

13. The method of claim 1 wherein the acid number of the prepolymer is 14– 22 and the amount of tertiary amine is at least sufficient to neutralize all of the acid groups in an equal weight of a prepolymer having an acid number of 14.

14. The method of claim 1 wherein the tertiary amine is selected from the group consisting of trimethylamine, triethylamine, tri-n-propyl amine, tri-n-butyl amine, N-methylpiperidine, N-ethylpiperidine, N-methylpyrrolidine, ethyldipropylamine, and mixtures thereof.

15. The method of claim 1 wherein the hindered isocyanate comprises tetramethylxylene diisocyanate.

16. The method of claim 1 wherein said mixture further comprises a tin catalyst for said prepolymer forming reaction.

* * * * *

UNITED STATES PATENT AND TRADEMARK OFFICE
CERTIFICATE OF CORRECTION

PATENT NO. : 5,494,960
DATED : February 27, 1996
INVENTOR(S) : Thomas E. Rolando It is certified that error appears in the above-indentified patent and that said Letters Patent is hereby corrected as shown below:

Col. 10, line 23, insert "100%" before "neutralization";

Signed and Sealed this

Sixteenth Day of July, 1996

BRUCE LEHMAN

*Attest:*

*Attesting Officer*     *Commissioner of Patents and Trademarks*